United States Patent
Kabannik et al.

(10) Patent No.: US 9,658,357 B2
(45) Date of Patent: May 23, 2017

(54) METHOD OF REAL TIME DIAGNOSTIC OF FRACTURE OPERATIONS WITH COMBINATION OF TUBE WAVES AND MICROSEISMIC MONITORING

(75) Inventors: Artem Valeryevich Kabannik, Novosibirsk (RU); Denis Yurievich Emelyanov, Novosibirsk (RU); Bruno Lecerf, Houston, TX (US); Kirill Leonidovich Tarasenko, Berdsk (RU); Andrey Vladimirovich Bogdan, Novosibirsk (RU); Dmitry Sergeevich Kuznetsov, Novosibirsk (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 597 days.

(21) Appl. No.: 13/698,051

(22) PCT Filed: May 19, 2011

(86) PCT No.: PCT/RU2011/000338
§ 371 (c)(1),
(2), (4) Date: Dec. 3, 2012

(87) PCT Pub. No.: WO2011/145985
PCT Pub. Date: Nov. 24, 2011

(65) Prior Publication Data
US 2013/0079935 A1    Mar. 28, 2013

(30) Foreign Application Priority Data
May 21, 2010  (RU) .................. 2010120482

(51) Int. Cl.
G05D 7/00  (2006.01)
G05D 11/00  (2006.01)
(Continued)

(52) U.S. Cl.
CPC .............. *G01V 1/40* (2013.01); *E21B 43/26* (2013.01); *E21B 47/14* (2013.01); *G01V 1/282* (2013.01);
(Continued)

(58) Field of Classification Search
CPC .......... G01V 1/008; G01V 1/288; G01V 1/30; G01V 1/40; G01V 1/44; G01V 1/50;
(Continued)

(56) References Cited

U.S. PATENT DOCUMENTS 4,802,144 A   1/1989  Holzhausen et al.
4,993,001 A   2/1991  Winbow
(Continued)

FOREIGN PATENT DOCUMENTS

EP   1400818   3/2004
GB   2231405   11/1990
(Continued)

OTHER PUBLICATIONS

T.L. Dobecki, "Hydraulic Fracture Orientation Using Passive Borehole Seismics," SPE 12110, 1983.
(Continued)

*Primary Examiner* — Mohammad Ali
*Assistant Examiner* — Md Azad
(74) *Attorney, Agent, or Firm* — Andrea E. Tran (57) ABSTRACT

This invention relates to petroleum industry, in particularly, to control and monitoring of processes related to reservoir stimulation. A method of real time diagnostic of fracture operations with combination of tube waves and microseismic monitoring, comprising performing a fracture in a wellbore, recording microseismic activity generated during the fracturing operations. Determining of microseismic event locations, generating low frequency pressure waves (tube waves) near the wellbore, recording of tube waves
(Continued)

reflections from the fractures in real time and analyzing microseismic event locations and tube waves reflections from the fractures.

8 Claims, 7 Drawing Sheets (51) Int. Cl.
G01V 1/00 (2006.01)
G01V 1/28 (2006.01)
G01V 1/40 (2006.01)
E21B 43/26 (2006.01)
E21B 47/14 (2006.01)
G06F 17/00 (2006.01)

(52) U.S. Cl.
CPC ............... *G05D 7/00* (2013.01); *G06F 17/00* (2013.01); *G01V 2210/1234* (2013.01)

(58) Field of Classification Search
CPC ....... G01V 11/00; E21B 43/17; E21B 47/101; E21B 47/042; E21B 47/18; E21B 47/091; E21B 47/011; E21B 43/26
USPC ......... 700/282; 702/16, 14, 12, 11; 166/308, 166/250; 367/13, 25, 38, 50, 68, 99; 340/853; 703/10
See application file for complete search history.

(56) References Cited

U.S. PATENT DOCUMENTS

| | | | |
|---|---|---|---|
| 5,081,613 | A | 1/1992 | Holzhausen et al. |
| 5,093,811 | A | 3/1992 | Mellor et al. |
| 5,170,378 | A | 12/1992 | Mellor et al. |
| 5,206,836 | A | 4/1993 | Holzhausen et al. |
| 5,934,373 | A | 8/1999 | Warpinski et al. |
| 5,996,726 | A | 12/1999 | Sorrells et al. |
| 6,724,687 | B1 | 4/2004 | Stephenson et al. |
| 7,391,675 | B2 | 6/2008 | Drew |
| 7,819,188 | B2 | 10/2010 | Auzerais et al. |
| 2005/0183858 | A1 | 8/2005 | Ayoub et al. |
| 2006/0034152 | A1 | 2/2006 | Korneev |
| 2008/0004847 | A1 | 1/2008 | Bradford |
| 2008/0068928 | A1 | 3/2008 | Duncan et al. |
| 2008/0239872 | A1 | 10/2008 | Miller et al. |
| 2009/0048783 | A1* | 2/2009 | Jechumtalova et al. ........ 702/11 |
| 2009/0259406 | A1* | 10/2009 | Khadhraoui et al. ........... 702/14 |
| 2009/0299637 | A1* | 12/2009 | Dasgupta ........................ 702/12 |

FOREIGN PATENT DOCUMENTS

| | | |
|---|---|---|
| GB | 2292802 | 3/1996 |
| GB | 2409722 | 7/2005 |
| GB | 2409723 | 7/2005 |
| WO | 00/33107 | 6/2000 |
| WO | 2005/029130 | 3/2005 |
| WO | 2007/037721 | 4/2007 |
| WO | 2009/004333 | 1/2009 |

OTHER PUBLICATIONS

Fisher, et al, "Integrating Fracture-Mapping Technologies to Improve Stimulations in the Barnett Shale", SPE 77441, 2002.
Maxwell, et al., "Imaging Seismic Deformation Induced by Hydraulic Fracture Complexity," SPE 102801.
Le Calvez, et al, "Using Induced Microseismicity to Monitor Hydraulic Fracture Treatment: A Tool to Improve Completion Techniques and Reservoir Management," SPE 104570, 2006.
Daniels, et al, "Contacting More of the Barnett Shale Through an Integration of Real-Time Microseismic Monitoring, Petrophysics, and Hydraulic Fracture Design," SPE 110562, 2007.
Eisnere, et al, "New Analytical Techniques to HelpImprove Our Understanding of Hydraulically Induced Microseismicity and Fracture Propagation,"SPE 1100813, 2007.
Warpinsky, et al., "Stimulating Unconventional Reservoirs: Maximizing Network Growth while Optimizing Fracture Conductivity," SPE 114173, 2008.
Potapenko, et al., "Barnett Refracture Stimulations Using a Novel Diverting System," SPE119636, 2009.
Xu, et al, "Characterization of Hydraulically-Induced Fracture Network Using Treatment and Microseismic Data in a Tight-Gas Formations: A Geomechanical Approach", SPE 125237, 2009.
Maxwell, et al., "Dual Array Microseismic Hydraulic Fracture Imaging," CSPG CSEG CWLS convention, 2008.
Examination Report issued in CA application 2799719 on Sep. 4, 2015, 3 pages.
Examination Report issued in Canadian Patent Application No. 2,799,719 on Nov. 8, 2016; 3 pages.

* cited by examiner

METHOD OF REAL TIME DIAGNOSTIC OF FRACTURE OPERATIONS WITH COMBINATION OF TUBE WAVES AND MICROSEISMIC MONITORING

This invention relates to petroleum industry, in particularly, to control and monitoring of processes related to reservoir stimulation.

PRIOR ART

The methods of monitoring processes in downhole conditions are known, for example, microseismic events monitoring and tube wave technique.

1. Microseismic

Low energy acoustic waves are created in solids due to sudden movement of fractures or zones of weakness. The energy release may be referred to as "acoustic emission" or, more commonly when the solid is a formation in the earth, the energy release is called a "microseismic event". Microseismic events may be caused by fluid pressure changes in the pore space of rock, which cause stress changes in the rock and movement at planes of weakness, or due to generation of hydraulic fractures. The seismic wave generated can be considered to be an extremely weak earthquake.

A large number of microseismic events are associated with the hydraulic fracturing process. It was found that an indication of hydraulic fracture direction and fracture dimensions can be derived from microseismic events occurring soon after the hydraulic fracture is formed.

Data from microseismic events were analyzed to determine the polarization of the p-wave from each event to determine azimuth direction of the event (Dobecki, SPE Paper 12110, 1983). In this case the polarization was determined from a "hodogram". A hodogram is a plot of the output of a geophone in one direction versus the output of a geophone in another direction. The distance from the event to the well was calculated by measuring the difference in arrival time of the p-wave and s-wave at the well and multiplying this difference by a factor involving the respective p- and s-wave velocities.

Microseismic is a powerful tool for hydraulic fracture monitoring purposes, however, there are some limitations caused by nature of microseismicity as well as current technology limitations.

First of all, there is limited spatial resolution of microseismic events (not less than 7 m) caused by noise and imperfection of processing algorithm.

The events are not necessarily located where fluid and proppant are transported, as some events are caused by energy release somewhere in a formation, not in the vicinity of a hydraulic fracture.

Microseismic event locations are very sensitive to p- and s-wave velocity model used, so a velocity model should be calibrated before any job.

Microseismic shows what happens in a formation at some distance from wellbore but it is blind to fluid entry points from the wellbore to formation, leading to difficult interpretation of near-wellbore processes.

The width and conductivity of hydraulic fractures cannot be determined from microseismic.

For the case of complex fracture networks primary fractures connected to wellbore cannot be resolved and moreover, there is no unique solution for fracture network.

Considering limitations of microseismic described above there is a clear need for additional data obtained using different techniques for better fracture job interpretation.

There are patents and patent applications describing the use of microseismic for different purposes:
  determining the orientation of natural fractures (WO 2005/029130, Pinnacle),
  determining the location and origin time of a hydraulic fracture (UK 2409723, Schlumberger),
  updating geological model with faults and fractures (US 2008/0004847, Schlumberger)),
  locating receiver in a monitoring well (WO 2009/004333, Schlumberger).

Another group of patents is related to different methods of microseismic processing to determine microseismic event locations and source parameters. They are still relevant, as waves can be used for improvement of microseismic processing, i.e. for velocity model calibration. There are patents and patent applications describing apparatus and method of location of microseismic events (UK 2292802, Exxon), passive seismic emission tomography (US 2008/0068928, Microseismic Inc).

Patents are known that describe microseismic event detection and location using CMM algorithm (U.S. Pat. No. 7,391,675, Schlumberger) and moment tensor inversion using only one monitoring well (US 2009/0048783, Schlumberger).

The last group of patents is not related to microseismic, but to other methods of hydraulic fracture monitoring, including tiltmeters (U.S. Pat. No. 5,934,373, Gas Research Institute) and small sensors with wireless communication or metallic proppant (US2005/01838581 Schlumberger).

PCT International Patent Publication No. WO 2005/029130 A2; Mar. 31, 2005; Sorrels et al; "Methods and Systems for Determining Orientation of Natural Fractures" assigned to Pinnacle Technologies. Methods, systems and articles of manufacturing consistent with this invention provide for determining the orientation of natural fractures in the Earth resulting from hydraulic fracturing treatment. Data attribute information from a far-field point-source signal profile for a microseismic event is extracted in the time domain. An estimate of the orientation of the natural fracture is calculated in the time domain based on the extracted data attribute information.

UK Patent Application Pub. No. 2409723; Jul. 6, 2005; Eisner et al; "Microseismic Determination of Location and Origin Time of a Fracture Generated by Fracturing Operation in a Hydrocarbon Well" assigned to Schlumberger. In a method of monitoring a subterranean location, microseismic signals are recorded by three component geophone arrays in two neighboring wells. A wavefield inversion algorithm is used to determine the mechanism, origin time and location of the seismic source. The algorithm does not require the signals to be resolved into P-wave and S-wave data before inversion. The algorithm evaluates Green's functions, uses an existing velocity model and decomposes a moment tensor to yield parameters characteristic of the fracture.

US Patent Application Pub. No. 2008/0004847 A1; Jan. 3, 2008; Bradford; "Method for Updating the Model of the Earth Using Microseismic Measurements" assigned to Schlumberger. A method for updating an earth model with fractures or faults using a microseismic data using mechanical attributes of an identified faults or fracture by matching a failure criterion to observed microseismic events for an identified fault or fracture.

PCT International Patent Application Publication WO 2009/004333 A1; Jan. 8, 2009; Eisner et al; "Method of Locating Receiver in a Well" assigned to Schlumberger. A microseismic method of determining the position of a downhole receiver making use of received signals from events at at least two known locations.

UK Patent Application Pub. No. 2292802; Mar. 6, 1996; Bayley et al; "Apparatus and Method of Determining the Location of the Source of Acoustic Waves in the Earth" assigned to Exxon Production Research Company. A method is disclosed for calculating the location of the seismic energy source with respect to the receivers, the method employing data from all the sensors and a performance function to minimize error in the determination of the location. Also disclosed is a simplified method for determining if a fracture has extended past a selected depth in a formation.

US Patent Application No. 2008/0068928 A1; Mar. 20, 2008; Duncan et al; "Method for Passive Seismic Emission Tomography" assigned to Microseismic Inc. A method for seismic mapping includes transforming seismic signals recorded at selected positions into a domain of possible spatial positions of a source of seismic events. An origin in spatial positions and time at least one seismic event is determined from space and time distribution of at least one attribute of the transformed seismic data.

U.S. Pat. No. 7,391,675 B2; Jun. 24, 2008; Drew; "Microseismic Event Detection and Location by Continuous Map Migration" assigned to Schlumberger. This invention provides methods and systems for microseismic hydraulic fracture monitoring in real-time. The methods and systems of the invention may include continuous map migration of recorded microseismic signals. The methods and systems provide robust automated simultaneous detection and location of microseismic events. This algorithm is implemented in Schlumberger microseismic processing software called eHFM.

US Patent Application No. 2009/0048783 A1; Feb. 19, 2009; Jechumtalova et al; "Method for Monitoring Seismic Events" assigned to Schlumberger. A microseismic method of monitoring fracturing operation or other microseismic events in hydrocarbon wells is described using the steps of obtaining multi-component signal recordings from a single monitoring well in the vicinity of a fracture or event; and rotating observed signals such that they become independent of at least one component of the moment tensor representing the source mechanism and performing an inversion of the rotated signals do determine the remaining components.

U.S. Pat. No. 5,934,373; Aug. 10, 1999; Warpinsky et al; "Apparatus and Method for Monitoring Underground Fracturing" assigned to Gas Research Institute, Chicago, Ill. An apparatus and method for measuring deformation of a rock mass around the vicinity of a fracture, commonly induced by hydraulic fracturing is provided. A plurality of inclinometers, for example tiltmeters are inserted downhole in a well and are used to measure the deformation rock around the induced fracture.

US Patent Application No. 2005/0183858 A1; Aug. 25, 2009; Ayoub et al; "Means and Method for Assessing the Geometry of a Subterranean Fracture During or After a Hydraulic Treatment" assigned to Schlumberger. A method is given of fracturing a subterranean formation including the step of a) pumping at least one device actively transmitting data that provide information on the device position, and further comprising the step of assessing the fracture geometry based on the positions of said at least one device, or b) pumping metallic elements, preferably as proppant agents, and further locating the position of said metallic elements with a tool selected from the group consisting of magnetometers, resistivity tools, etc., and further comprising the step of assessing the fracture geometry based on the positions of said metallic elements. The method allows monitoring of the fracture geometry and proppant placement.

Open publications are available about use of miscroseismic data for interpretation of fracturing events:

SPE 77441, "Integrating Fracture-Mapping Technologies To Improve Stimulations in the Barnett Shale", Fisher et al, 2002; presents a new method for evaluating large microseismic datasets based on combination of microseismic with surface- and downhole-tilt fracture mapping techniques which allows characterization of the created-fracture networks. Correlations between production response and various fracture parameters was presented along with discussions of methods for calibrating a fracture model to the observed fracture behavior.

SPE 102801, "Imaging Seismic Deformation Induced by Hydraulic Fracture Complexity", Maxwell et al; shows how density of fracture network can be assessed using seismic moment density. Correlation of stimulated reservoir volume multiplied by seismic moment density with well production was observed.

SPE 104570, "Using Induced Microseismicity To Monitor Hydraulic Fracture Treatment: A Tool To Improve Completion Techniques and Reservoir Management", Le Calvez et al, 2006; describes how monitoring of microseismic can be used to characterize fracture development and geometry using a couple of examples from various formations (shale gas, tight gas, etc.).

SPE 110562, "Contacting More of the Barnett Shale Through an Integration of Real-Time Microseismic Monitoring, Petrophysics, and Hydraulic Fracture Design", Daniels et al, 2007; presents case studies which show how the use of real-time fracture mapping allows for on-the-fly changes in fracture design. Mapping also impacts the perforation strategy and re-stimulation designs to maximize the Effective Stimulation Volume (ESV). This paper further correlates microseismic activity to log data and illustrates how logs can be used to estimate fracture geometry. This data is then used to design a fit-for-purpose stimulation that has the greatest chance of maximizing the ESV and production.

SPE 110813, "New Analytical Techniques To help Improve Our Understanding of Hydraulically Induced Microseismicity and Fracture Propagation", Eisner et al, 2007; presents new technique for microseismic event location which leads to higher number of located events and shows that initial gaps in located microseismicity appear to be artifacts owing to monitoring geometry. Also, high density of located microseismic events allows defining the velocity of the fracture system propagation.

SPE 114173, "Stimulating Unconventional Reservoirs: Maximizing Network Growth while Optimizing Fracture Conductivity", Warpinsky et al, 2008; describes results of simulations and microseismic mapping for shale gas and tight gas formations. Microseismic mapping demonstrates that complex fracture networks are achievable for low-permeability formations.

SPE 119636 "Barnett Refracture Stimulations Using a Novel Diverting System", Potapenko et al, 2009; describes a new fracture diversion technique and demonstrates how real-time microseismic monitoring has enabled operators to make informed decisions that influence fracture geometry, increase lateral coverage and improve gas recovery.

SPE 125237, "Characterization of Hydraulically-Induced Fracture Network Using Treatment and Microseismic Data in a Tight-Gas Formation: A Geomechanical Approach", Xu et al, 2009; describes a semi-analytical pseudo 3-D geomechanical model of induced fracture network that was developed based on considerations of the conservation of injected fluid mass and the mechanic interactions both between fractures and injected fluid as well as among the fractures.

Publication "Dual Array Microseismic Hydraulic Fracture Imaging", Maxwell et al, 2008 (CSPG CSEG CWLS Convention) presents the comparison of accuracies from single monitoring well with that from two monitoring wells. The dual well observations provide an opportunity for enhanced velocity model validation in addition to enhanced source imaging techniques to provide additional information about the fracture geometry.

2. Tube Waves

Tube waves are pressure waves propagating along wellbore walls at the velocity approximately equal to the sound velocity in the fluid. Obstacles in the wellbore, pipe sections with different diameters, perforations and open fractures are characterized by different hydraulic impedances and serve as tube wave reflectors. Hydraulic impedance is ratio of oscillatory pressure to oscillatory flow can be also thought as acoustic rigidity of the media. The downhole reflector's properties can be interpreted in terms of their impedances. One way to determine depths and impedances of reflectors is to generate pressure pulses and measure travel times and amplitudes of reflected/propagated waves. These properties make tube waves a very attractive method for monitoring multistage treatment: it can be used to determine the depth of fluid entry point in the formation, to estimate the wellbore-reservoir connectivity, and finally to determine the location of obstacle inside the wellbore. The main applications of the tube waves listed in the literature refer to pipeline leakage diagnostics. In the oilfield industry the tube waves are commonly used for determination of the fracture characteristics such as depth, dimensions, closure pressure, etc. The technique which uses tube wave reflections for fracture depth and closure pressure determination is called Hydraulic Impedance Testing (HIT) and is being used by Pinnacle Technologies.

The usage of the tube waves for stimulation monitoring is limited by it scope: only objects that are close to the wellbore affect the tube waves (interpretation of reflections from the fracture tip are patented but have not yet been observed in practice). The resolution of the tube wave analysis is limited by the signal dispersion and attenuation in the wellbore.

There are several patents protecting usage of tube waves for fracture properties determination. All of them except one, describe various methods of fracture geometry determination.

A method of determining the geometry of a hydraulic fracture is disclosed in U.S. Pat. No. 4,802,144; Jan. 31, 1989; Holzhausen et al; "Hydraulic fracture analysis method" assigned to Applied Geomechanics Inc. The patent describes estimation of fracture geometry (height, width and length) from measured pressure waves by comparing them to the oscillatory behavior predicted by different mathematical models. It also claims determining the orientation of a hydraulic plain, measuring seismic ground motion above a region which includes the fracture. This is probably the first patent covering using of tube waves for fracture evaluation, however it doesn't claim reflection depths determination. It also claims using the reciprocating pumps as oscillation source.

A method of locating downhole reflectors and their hydraulic impedances is disclosed in U.S. Pat. No. 5,081,613; Jan. 14, 1992; Holzhausen et al; "Method of identification of well damage and downhole irregularities" assigned to Applied Geomechanics Inc. The method involves creating free and forced pressure oscillations in the well. The measured decay rates and resonant frequencies of the oscillations are used to determine characteristic impedance and the depth of each reflection in the well, after removing resonances caused by known reflectors.

U.S. Pat. No. 5,093,811; Aug. 5, 1991; Mellor et al; "Fracture investigation by resonance sweeping technique" assigned to The British Petroleum Company. A method of determining height and length of a fracture in a borehole involves generating pressure waves at closely spaced frequencies by means of a transmitter at the wellhead. A theoretical model of the wellbore-fracture system is generated and compared with the measured response to determine the height and length of the fracture.

U.S. Pat. No. 5,170,378; Dec. 8, 1992; Mellor et al; "Hydraulic Impedance Test Method: Determining the height and length of the fracture" assigned to The British Petroleum Company. The fracture length is determined by the time delay between reflections from fracture mouth and tip. The patent is focused on fracture length determination; however it uses results from Holzhausen's U.S. Pat. No. 5,081,613 for fracture mouth reflection time. The patent also describes pressure pulse producing technique by opening and closing a valve at the wellhead. The theoretical model for the reflections is obtained by representing the wellbore-fracture system as analogous to lengths of electrical transmission lines.

U.S. Pat. No. 5,206,836; Apr. 27, 1993; Holzhausen et al; "Method of Determining Position and Dimensions of a Subsurface Structure Intersecting a Wellbore in the Earth" assigned to Gas Research Institute. The patent describes fracture dimensions and depth determination from its impedance and it claims determining the fracture closure pressure.

U.S. Pat. No. 6,724,687 B1; Oct. 26, 2000; Stephenson et al; "Characterizing oil, gas or geothermal wells, including fractures thereof" assigned to Halliburton Energy Services, Inc. The patent claims characterizing wells by generating an excitation events that create a responsive signal having lower and higher frequency components, which higher frequency component provides information about one or more characteristics of the well. The applications for the patent include: relative fluid flow through respective perforations and determination of fracture geometry and fracture growth.

Patent application U.S. NP Ser. No. 11/691,071 filed on Mar. 26, 2007; Miller, et al; "Wireless Logging of Fluid Filled Boreholes" assigned to Schlumberger. The application teaches locating and monitoring changes in downhole conditions by recording, generating and analyzing tube waves propagating in the borehole system. The abstract indicated that this application covers tubing wave reflection depths determination. However there is no clarity about determining hydraulic impedance of the reflector.

Patent application U.S. NP Ser. No. 11/962,190; Dec. 21, 2007; Miller, et al; "Monitoring, Controlling and Stimulating Processes While Stimulating A Liquid-Filled Borehole" assigned to Schlumberger. The application has a description of diversion validation algorithm by monitoring the tube wave reflection depths before and after diversion. The plug effectiveness estimation by measuring its hydraulic impedance is not disclosed in the application.

There are also two patents describing coupling between tube waves and seismic waves propagating through formation:

U.S. Pat. No. 4,993,001; Feb. 12, 1991; Winbow, et al; "Method and apparatus for converting tube waves to body waves for seismic exploration" assigned to Exxon Production Research Company. The patent discloses method and apparatus for converting tube waves into body waves comprising a rotary valve tube wave source for producing swept frequency tube waves that are injected into a tubing or wellbore. The tube waves are converted to body waves by an elongate tube wave converter located at a selected position downhole. The tube wave converter comprises an elongate body that preferably substantially fills the wellbore or tubing and has a preferred shape in order to convert efficiently the tube waves to body waves at the selected position downhole.

US Patent Application No. 20060034152A1; Feb. 16, 2006; Valery A. Korneev; "Tube-wave seismic imaging" assigned to The Regents of the University of California. A tube-wave is initiated in a source well by a source, travels in the source well, is coupled to a geological feature, propagates through the geological feature, is coupled back to a tube-wave at a receiver well, and received by receiver(s) in either the same or a different receiving well. The tube-wave has been shown to be extremely sensitive to changes in reservoir characteristics. Tube-waves appear to couple most effectively to reservoirs where the well casing is perforated, allowing direct fluid contact from the interior of a well case to the reservoir.

SUMMARY OF THE INVENTION

The invention described in this paper is a novel method to monitor fracture development in real time, which gives access to information that is not accessible with current practices. It consists in analyzing measurements from two techniques in a simultaneous manner: microseismic (MS) activity generated during the fracturing operation, and reflections from low frequency pressure waves (tube waves) generated and propagating in the wellbore and reflecting from fractures, obstacles in the wellbore, completion segments, etc. This combination of monitoring techniques provides simultaneous information about the effect of the fracturing operation in the rock, at distances ranging typically from 15 to 300 m away from the wellbore—from microseismic monitoring, with information about the connectivity of the fracture at the wellbore—from monitoring the low frequency waves.

Several new techniques can be developed based on the dual use of microseismic and tube wave monitoring as essential part of the invention.

a) Calibrating the velocity model used for P- and S-wave propagation in the first moments of fracturing operations;

b) Determining with high resolution the entry point (perforation/perforation cluster) which is connected to a fracture network measured with microseismic;

c) Differentiating the microseismic events generated from independent fractures intersecting the wellbore, vs. the activity generated by a fracture network with one entry point;

d) In some cases, evaluating tortuosity of the fracture (from longitudinal to transverse, and vice versa);

e) Identification of the fact of shut down of microseismic activity along the wellbore (caused by screen out, for example) before it can be detected on a pressure gauge;

f) Isolating the cause of activity appearing along a certain section of the wellbore (leaking of the bridge plug, unseating of ball sealer in the perforation hole);

g) Tube waves propagating in the fracture, and reflected by the fracture tip, can be used to differentiate microseismic events occurring at the tip of the fracture and which are hydraulically connected to the wellbore, vs. the microseismic events which are not connected to the fracturing.

h) Tube waves propagating in the fracture can also be used to resolve fracture geometry at a finer degree than microseismic monitoring, and thus allows detecting fractures planes developing at a close distance, where microseismic monitoring would only see one growing fracture plane.

The combined use of these two techniques and interpretation of correlation between different set of data helps in more accurate identifying the initial stage of fracture development and all following events accompanying the hydraulic fracturing of subterranean reservoir.

DESCRIPTION OF THE INVENTION

1. Seismic Sensor Orientation and Calibration for Seismic Wave Propagation Velocity Model Microseismic events are recorded by 3-component geophones located downhole. The orientation of these 3 components should be known to properly determine microseismic event azimuths. To calibrate the sensor orientation, events with known azimuths such as perforation shots or string shots in treatment well are generally used.

Figure 1:
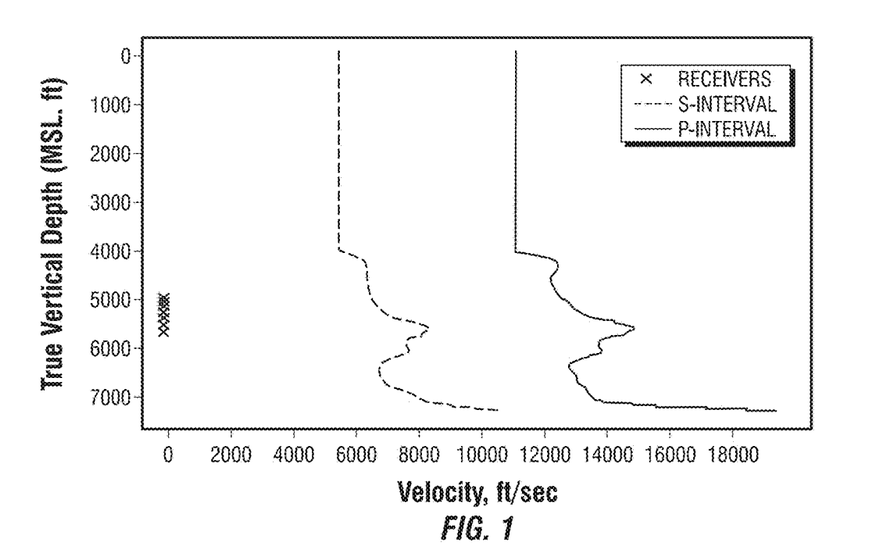
FIG. 1. Example of one-dimensional model for velocities of P- and S-waves; the velocities are used for identification of a microseismic event.
Figure 2:
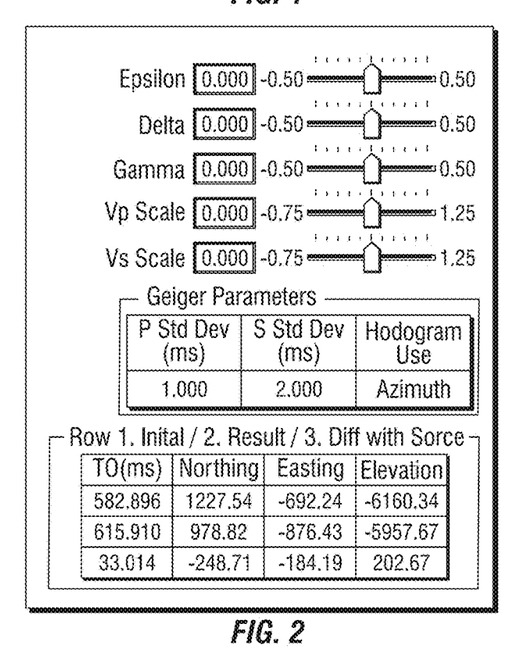
FIG. 2. Example of errors in origin time and event location before calibration.
Figure 3:
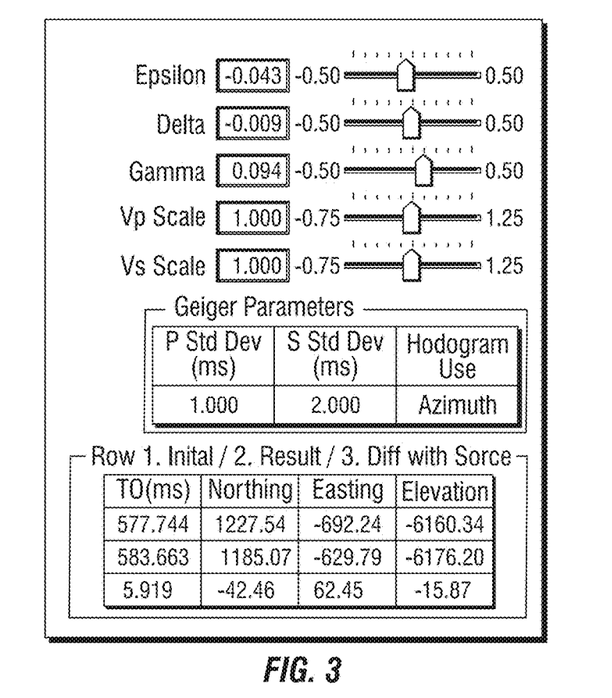
FIG. 3. Example of errors in origin time and event location after calibration.

P- and s-wave velocity models used for microseismic event location are usually derived from acoustic logs. This leads to the 1D model consisting of horizontal layers of different velocities (FIG. 1). Also, typically the anisotropy is applied leading to different velocities for different azimuths. The anisotropy is greatly affecting microseismic event locations; therefore, it needs to be calibrated before a job. For calibration, again, perforation shots or string shots in treatment well are used. The microseismic signal caused by the perforation shot is recorded by geophone array and processed resulting in the event location. The velocity model is calibrated by matching this event location with actual location of perforation shot which is known. During this matching frequently only anisotropy parameters Epsilon, Delta and Gamma are being adjusted, however, the velocities themselves (S- and P-) also can be tuned. FIG. 2 and FIG. 3 show example of how anisotropy parameters can be changed before and after calibration.

The main disadvantages of this procedure for sensor orientation and velocity model calibration lies in the need for perforation shot or a string shot in a treatment well. This is an issue, particularly when a well is restimulated and that perforation shots are not part of the intervention plan. This limitation can be solved by accounting for the fact that in a hydraulic fracture treatment, the first events are located in front of open perforations. These events can be used for calibration purposes using tube-wave reflections from the open perforations.

Figure 4:
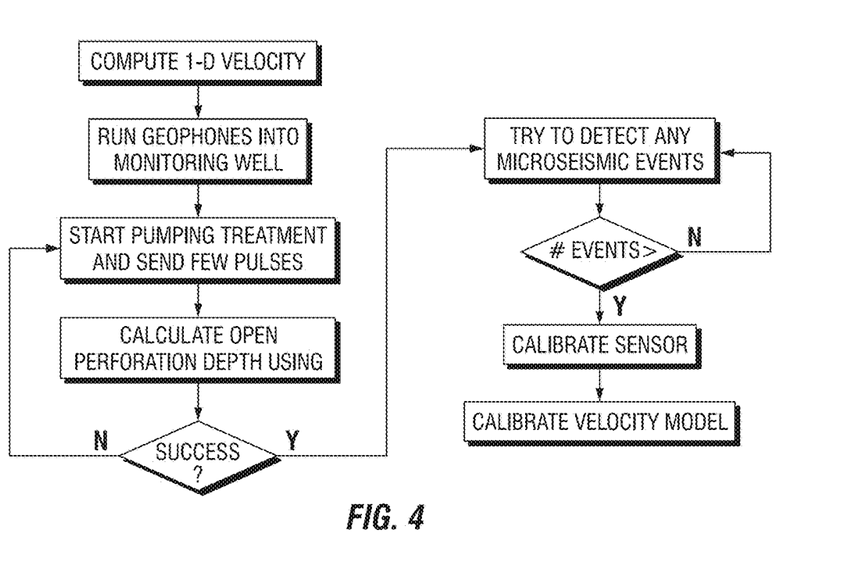
FIG. 4: Example of workflow for sensor orientation and velocity model calibration.

Example workflow is shown on FIG. 4.

The usage of the tube waves for seismic velocity model calibration can be even more effective if the seismic waves will be generated by a tube-wave converter located at a selected position downhole. Specially designed bridge plug can serve as such permanent reference seismic source. In this case the velocity model can be calibrated using a large number of events which should improve accuracy. Moreover, it can be easily re-calibrated at any time during the job

Figure 5:
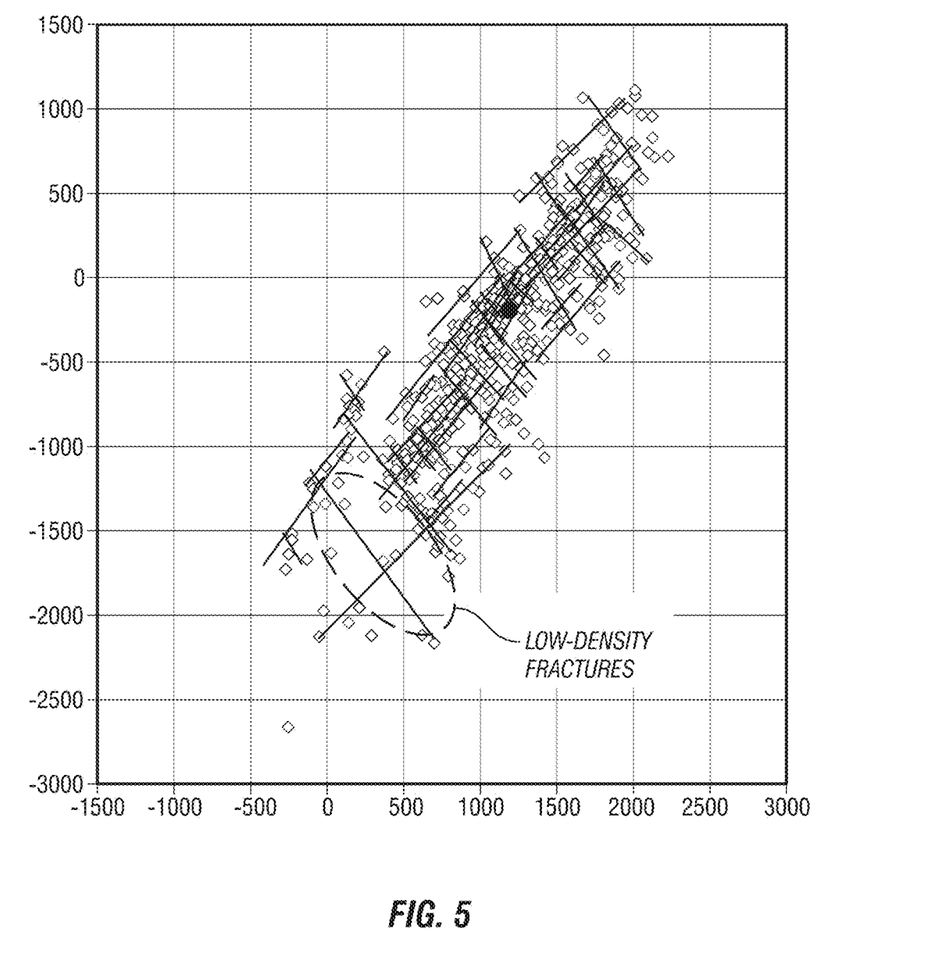
FIG. 5: Understanding the fracture network geometry from microseismic data (from SPE 77441).

2. Determining with High Resolution the Entry Point (Perforation/Perforation Cluster) which is Connected to the Fracture Network Measured with Microseismic FIG. 5 shows the typical information that can be extracted from microseismic interpretation. While the hydraulic fracture is causing the microseismic events, it is not possible to map the fracture planes, and network with confidence (see an example of fracture network in FIG. 5. Additionally, one needs to bear in mind that the location of a microseismic event is determined with an uncertainty of the order of 6 m. With such an uncertainty, it is not possible to know the exact number of fracture that are connected to the wellbore from microseismic only (sometimes called "primary fracture"). Bear in mind that 6 m is of the order of the spacing of natural fractures in shales (Xu et al. estimate natural fracture spacing of 1.3 m to 50 m in the Barnett shale [2]), so it is reasonable to have parallel fractures connected to the wellbore within 6 m in some formations.

Figure 6:
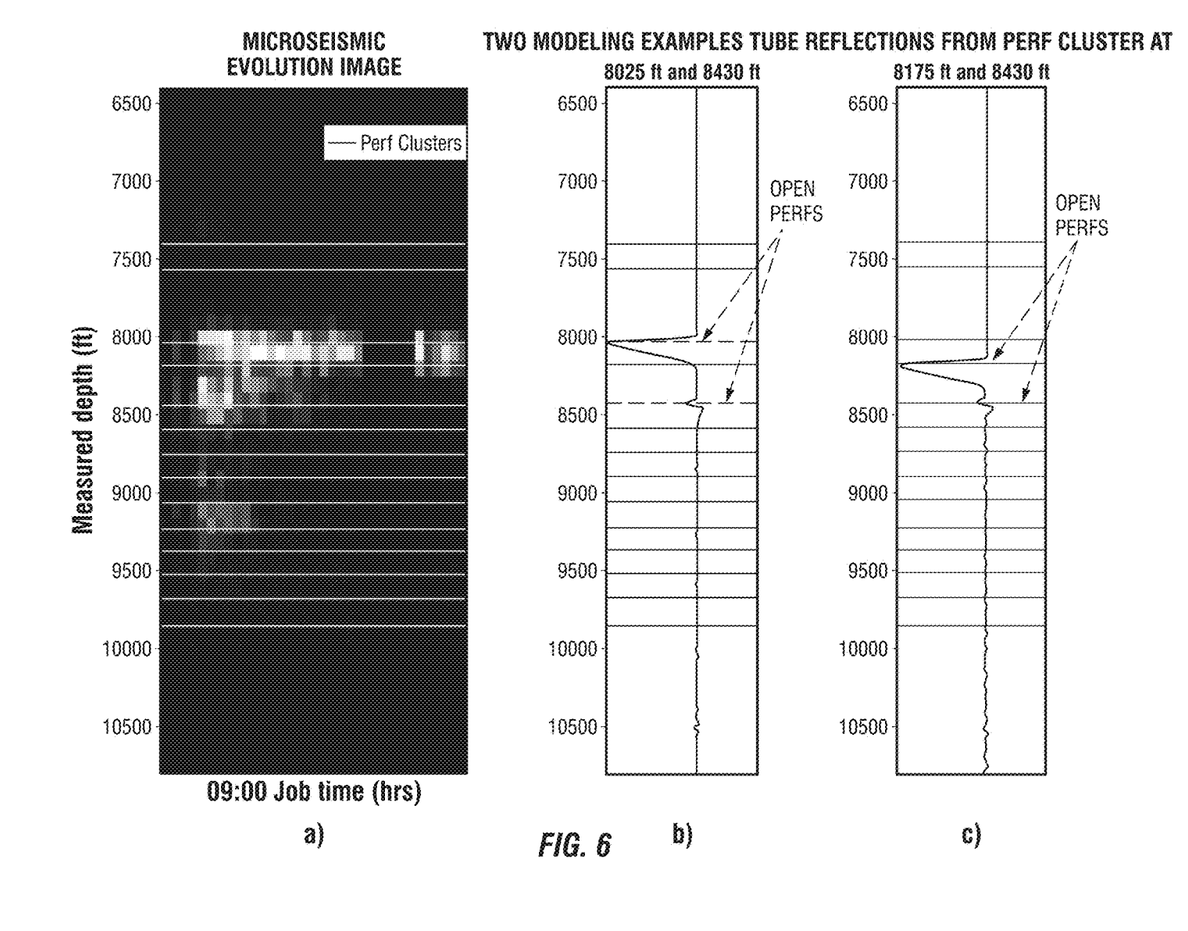
FIG. 6: Microseismic activity evolution image a) that could be caused by two equivalent entry point distribution models b) and c). Multiple entry point locations are detected by the tube waves very precisely.

Typically, to estimate the entry point of the fracture, the clouds of microseismic events are projected orthogonally to the wellbore as it is shown at FIG. 6a. Here the total job time is split into fixed time bins and then the microseismic activity distribution is plotted for each individual bin as color image. Such data representation gives an idea about microseismic activity evolution along the wellbore with time and can be correlated with perforation clusters to determine fracture entry point. However, it is accepted that in formations such as shales, fractures follow highly non-linear, and unpredictable paths, resulting in wrong estimation of the entry point of the wellbore in the fracture. The uncertainty on the location of the entry point can have significant consequences, for example, when the operator places a bridge plug with the intent to isolate the perforations that are already connected to the fracture. Without knowing which perforation is effectively connected to the fracture, a misplaced bridge plug can either isolate perforations which are not stimulated, ultimately resulting in a section of the wellbore left unstimulated or fail to isolate perforations which are connected to the fracture, and which will take fluid in the subsequent stage.

FIG. 6a shows superposition of trace of microseismic projected orthogonally along the wellbore during a fracturing treatment and two possible entry point distribution shown at FIG. 6b and FIG. 6c that could potentially cause this activity. One can see from simulations predicting tube waves reflections that the pulse reflections allow determining multiple entry point positions with high resolution. So, by monitoring the wellbore with tube waves during the treatment, one can determine if the microseismic "cloud" is generated by commingled stimulation of 1, or 2 perforation clusters, and locate the perforation clusters precisely.

This information can be used in many applications for stimulation strategy (placement of bridge plug, restimulation of a well). Also, the number of fracture connected directly to the wellbore impacts the production. Being able to determine the number of fracture connected to the wellbore allows improving the production forecast in shale treatment.

3. Isolating the Cause of Shut Down of Microseismic Activity Along the Wellbore Before it can be Detected on a Pressure Gauge Proppant accumulating in the wellbore during treatment can plug the wellbore causing flow restriction and quick pressure rise (screenout). The pressure rise and microseismic activity shutdown are screenout indicators but they happen after plugging and cannot be used for its early detection.

Figure 7A:
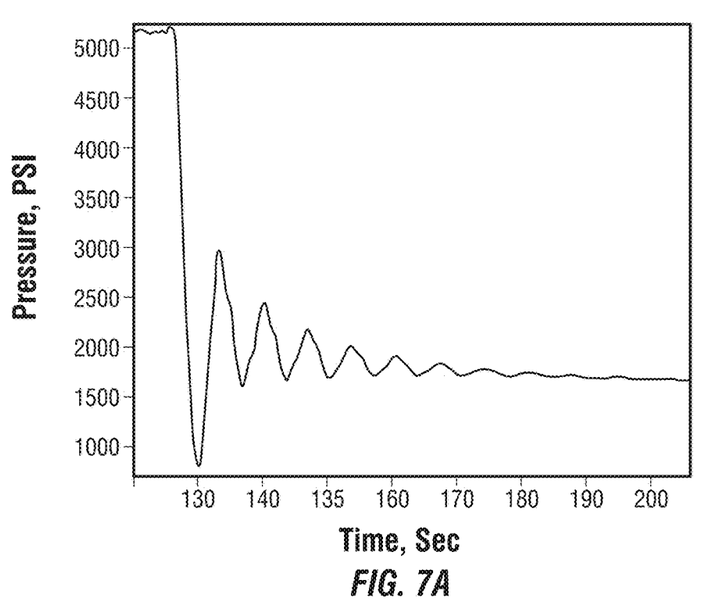
FIG. 7. Two different pressure oscillation patterns: reflection from an open fracture results in odd harmonics in the spectrum a); reflection from a sand plug in the wellbore results in even harmonics b) and reflectors positions plotted on top of the microseismic evolution image c).
Figure 7B:
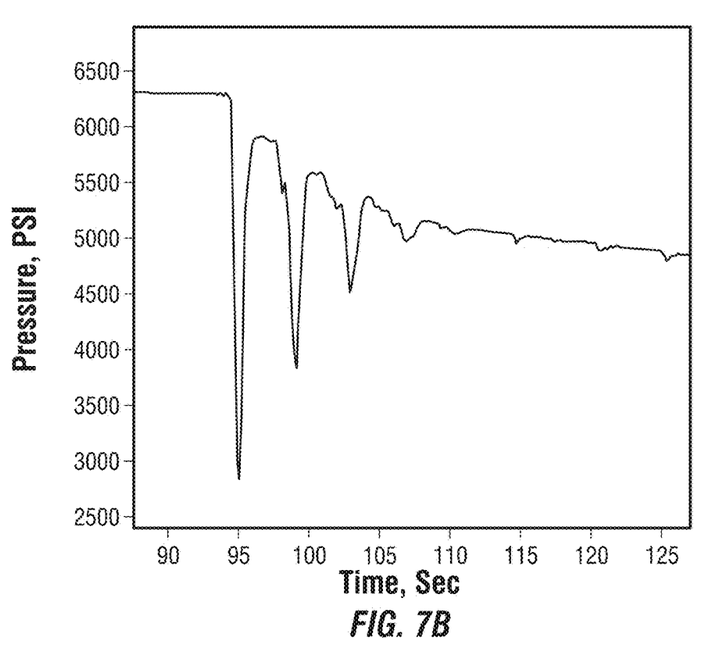
Figure 7C:
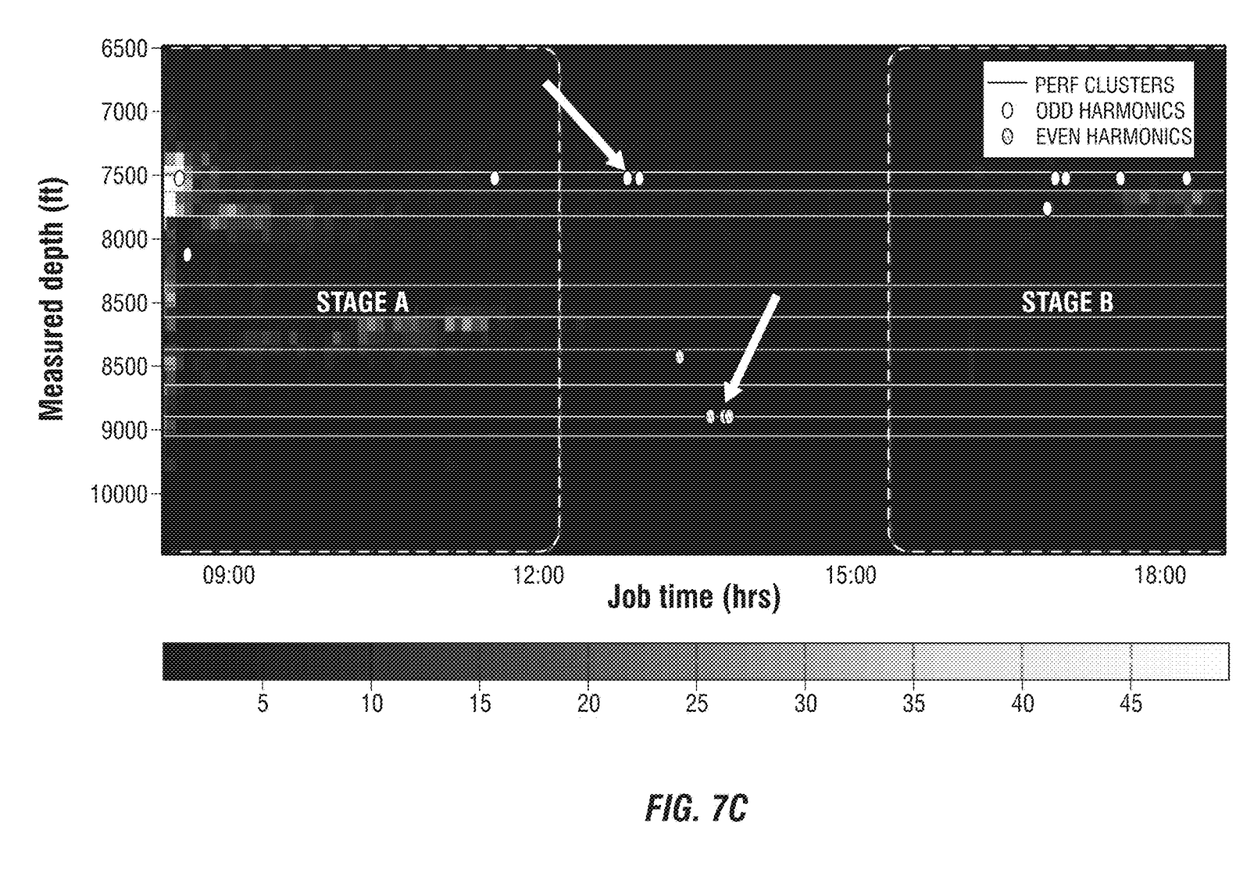

FIG. 7 shows two pressure oscillation events caused by flowing rate changes recorded before a), after screenout b) and corresponding reflector positions plotted on top of the microseismic evolution image c). Pressure oscillations at FIG. 7a correspond to tube wave reflection from an open fracture: the subsequent peaks have opposite polarities that result in odd harmonics on the spectrum. Reflections from the sand plug in the wellbore have different patterns: subsequent peaks have the same polarity that results in odd harmonics on the spectrum. Wellbore screenout shown both by tube waves and treatment pressure increase is also confirmed by microseismic data in FIG. 7c. This effect can be used for screenout diagnostics at early stages: periodic pulsing will help to disclose sand accumulation by harmonic analysis of the spectrum or by monitoring the reflection pattern changes.

4. Isolating the Cause of Activity Appearing Along a Certain Section of the Wellbore (Leaking Bridge Plug, Ball Sealer Unseating)

Conversely, combining tube wave and microseismic allows understanding the reason for generation of MS activity in a certain section of a wellbore. Examples are wellbore section isolation with bridge plug and perforation plugging with ball sealers.

a. Bridge Plug

In a multistage treatment, once a bridge plug is placed to isolate a stage, one expects to see no MS activity in the section of the well between the bridge plug and the toe. In the case where MS activity appears or is still observed in that section after the bridge plug is set, a correct troubleshooting must differentiate whether the "leak" is in the wellbore (for example, a bridge plug which is "leaking"), or on the formation side (for example, poor zonal isolation caused by a microannulus in the cement).

Figure 8:
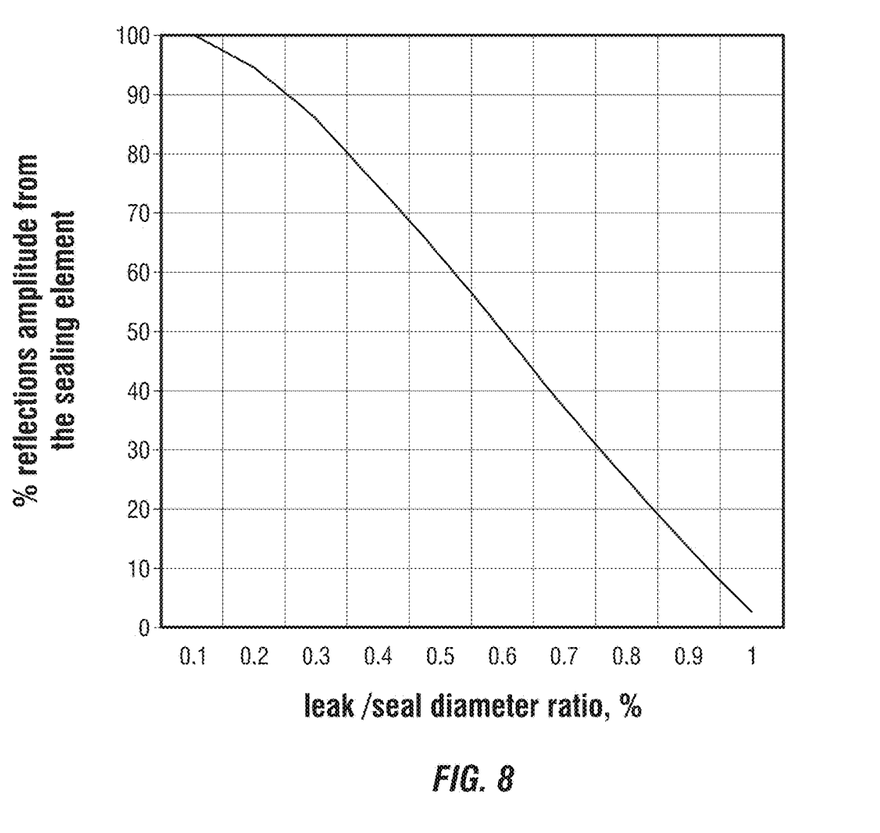
FIG. 8. Dependence of the reflected signal from the sealing element vs. leak/seal diameter ratio.

FIG. 8 shows the dependence of the reflection signal amplitude from the bridge plug vs the ratio of the leaking element diameter, obtained by simulations modeling of tube waves propagation in borehole. If the sealing element is working properly (no leak, on Y axis) then 100% of the signal is reflected by the sealer (bridge plug). As the diameter of the leak increases, a larger part of the signal propagates through the sealing element and is not reflected. A curve such as depicted in FIG. 8 can be used as a calibration curve to estimate the effective diameter of the leak in the bridge plug. Knowing the effective diameter of the leak is a valuable piece of information for remedial.

b. Ball Sealer

In a multistage treatment where ball sealers are used to isolate a stage, one expects to see no MS activity at depths where the ball sealers are placed. In the case where microseismic activity is still observed in that section, a correct troubleshooting must differentiate whether the "leak" is due to a ball sealer that is not properly sealing the perforation, or that has left the perforation n which it was sitting, or on the formation side (for example, poor zonal isolation caused by a microannulus in the cement).

Similar to the bridge plug example the troubleshooting can be done using the tube wave reflectivity. When perforations are plugged by ball sealers, no signal is reflected; if leakage is present, then tube wave will reflect from the fracture. The amplitude of reflected wave will be maximum for completely unsealed perforation cluster. A curve using a similar approach as the one depicted in FIG. 8 can be used to estimate the effective diameter of the 'leak' and to identify whether balls are properly seated, but do not provide complete sealing, or if the ball has unseat from a perforation.

In both examples a) and b), proper troubleshooting will allow for a proper remediation.

What is claimed is:

1. A method of real time diagnostic of fracture operations, the method comprising:
performing fracture operations in a wellbore comprising forming a fracture in communication with the wellbore;
recording microseismic activity generated by the fracturing operations;
determining microseismic event locations;
generating tube waves to propagate along the wellbore toward the fracture and reflect from the fracture along the wellbore;
recording the tube wave reflections from the fracture in real time;
analyzing the microseismic event locations and the tube wave reflections from the fractures;
using the tube wave reflections to orient seismic sensors and to calibrate a seismic wave propagation velocity model;
determining leakage in a plug associated with the wellbore based on the tube wave reflections; and
performing a remediation operation based on the determined leakage;
wherein the seismic sensor orientation and the seismic wave propagation velocity model calibration comprise:
computing a 1-D velocity model;
placing geophones into a monitoring wellbore;
sending the tube waves downhole during the fracturing operations;
calculating open perforation depth from the tube wave reflections during the fracture operations;
determining whether the fracturing operations were successful by:
initiating the tube waves in the borehole after completing the fracture operations,
sensing a response from the borehole for the tube wave reflections, and
calculating downhole feature depth based on the sensed response; and
if the fracturing operations are determined to be unsuccessful:
selecting a first remediation of the fracturing operations based on the sensed response; and
performing the first remediation of the fracturing operations; and
calibrating the seismic sensor orientation;
calibrating the microseismic wave propagation velocity model.

2. The method of claim 1, wherein the microseismic activity is recorded by detectors located downhole at a distance of no more than 600 m away from the wellbore.

3. The method of claim 1, wherein an entry point location is detected by superposition of the microseismic activity distribution and the tube wave reflections.

4. The method of claim 1, wherein a wellbore screenout is diagnosed by a simultaneous change of polarity of peaks of the reflected tube waves, fracturing operation treatment pressure increase and microseismic activity shutdown.

5. The method of claim 1, wherein a cause of the microseismic activity along a certain section of the wellbore is diagnosed by correlation of the recorded microseismic activity and a value of the recorded tube wave reflections from elements of the certain section of the wellbore.

6. The method of claim 5, wherein the cause of the microseismic activity along the certain section of the wellbore comprising a bridge plug is diagnosed as leaking of the bridge plug if the value of the recorded tube wave reflections from the bridge plug is less than 100%.

7. The method of claim 5, wherein the cause of the microseismic activity along the certain section of the wellbore comprising placed ball sealers is diagnosed as leaking of perforation holes if the recorded tube wave reflections are from the certain section of the wellbore.

8. The method of claim 1, wherein the determining leakage comprises differentiating whether the leakage occurs in the wellbore or on a side of a formation.

\* \* \* \* \*